Figure 1:
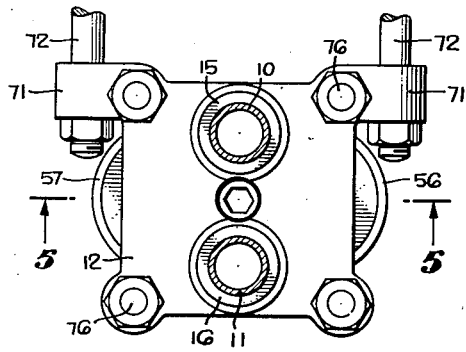

Nov. 9, 1954                    C. U. BALLARD                    2,693,811
TEMPERATURE COMPENSATOR FOR CLOSED HYDRAULIC SYSTEMS
Filed March 13, 1952                                 3 Sheets-Sheet 1

CHARLES U. BALLARD,
INVENTOR.

BY
Hazard & Miller
ATTORNEYS

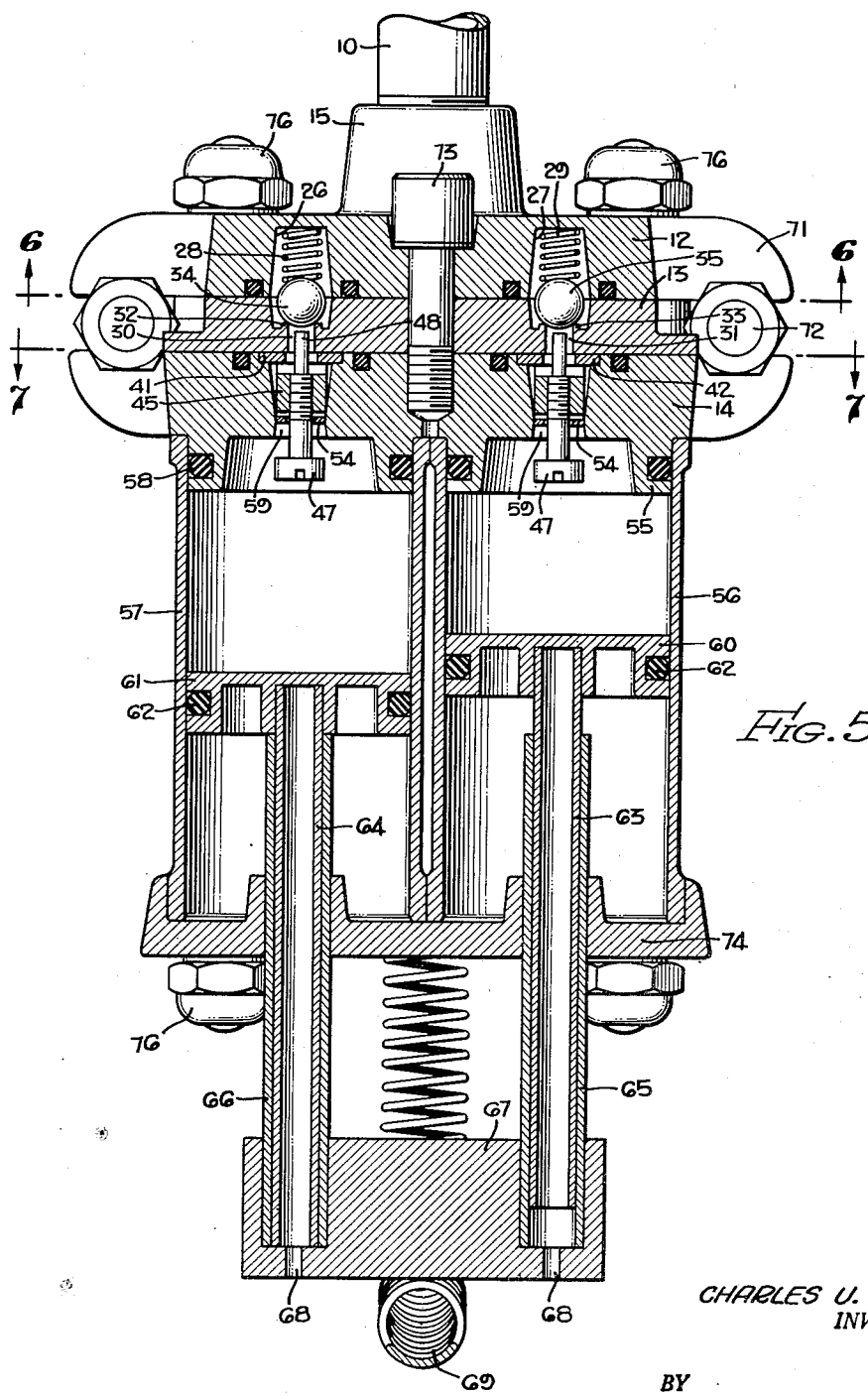

Nov. 9, 1954          C. U. BALLARD          2,693,811
TEMPERATURE COMPENSATOR FOR CLOSED HYDRAULIC SYSTEMS
Filed March 13, 1952                     3 Sheets-Sheet 3

CHARLES U. BALLARD,
INVENTOR.

BY
Hazard & Miller
ATTORNEYS

United States Patent Office 2,693,811
Patented Nov. 9, 1954

2,693,811

TEMPERATURE COMPENSATOR FOR CLOSED HYDRAULIC SYSTEMS

Charles U. Ballard, Inglewood, Calif.

Application March 13, 1952, Serial No. 276,257

6 Claims. (Cl. 137—87)

This invention relates to improvements in compensators for telemotor systems, and may be regarded as an improvement over the construction disclosed in my copending application Serial No. 199,648, filed December 7, 1950.

The conventional or usual telemotor system has some form of actuator connected to a motor by means of two conduits or lines filled with liquid. When the actuator is operated in one direction the liquid in one of the conduits or lines is forced by the actuator toward the motor to actuate the motor. The liquid in the other conduit is returned therethrough from the motor to the actuator. When the actuator is operated in the opposite direction the reverse situation occurs.

The two lines connecting the actuator to the motor are kept filled with liquid so that no lost motion between the actuator and the motor can occur. Telemotor systems, however, are frequently subjected to considerable temperature variation. This is particularly true where the telemotor system is installed on aircraft which may be flying through sub-zero temperatures at high altitudes and then brought to normal temperatures in a relatively short time on landing. Conversely, aircraft which may be at normal temperatures on a landing field may suddenly have the temperature severely reduced on taking off and flying to relatively high altitudes. A quick elevation in temperature brings about an expansion of the liquid in the conduits or lines of the telemotor system, and some provision must be made to relieve the pressure in the lines occasioned by such expansion. Conversely, if the telemotor system is quickly cooled the liquid therein may contract and fluid must be supplied to the lines to compensate for the contraction and keep the lines filled between the actuator and the motor. The compensator enables liquid to be bled from the lines when the liquid therein expands beyond predetermined degree and also permits liquid to be returned to the lines to compensate for contraction. At the same time both lines are maintained in such condition that pressure may be transmitted through either of the lines between the actuator and the motor at all times so that the motor can be actuated by the actuator.

An object of the present invention is to provide an improved compensator of this character so designed that the body of the compensator can be easily and economically manufactured and the parts thereof readily assembled together. In order to reduce the cost of a compensator of this character it is proposed to form the parts of the body of diecastings although it will be appreciated that the present invention is not necessarily restricted thereto. However, the ability to manufacture parts from diecastings and readily assemble the parts together is a contributing factor for designing certain parts in the manner herein disclosed.

Another object of the invention is to provide a compensator which cannot only be easily and economically manufactured and assembled, but also to provide a compensator which may be of relatively small and highly compact form and which will perform all of the necessary functions required of it.

Figure 4:
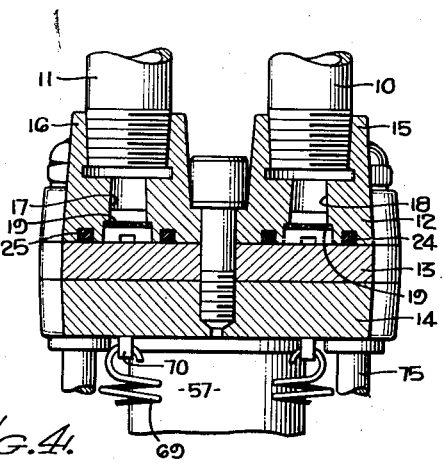
Figure 2:
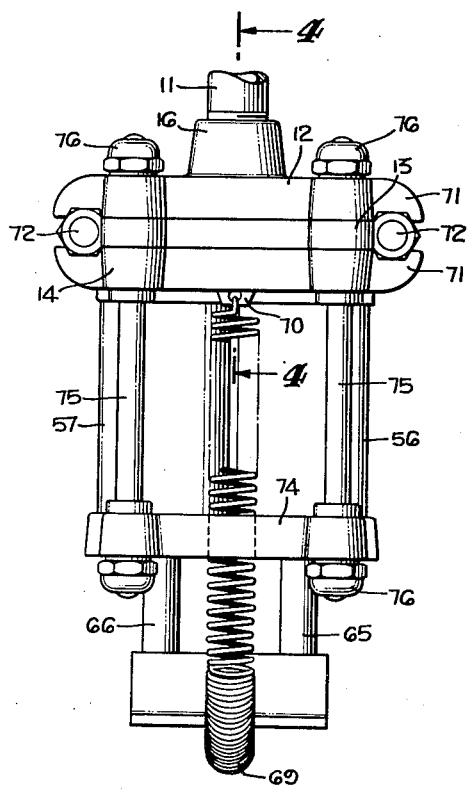
Figure 3:
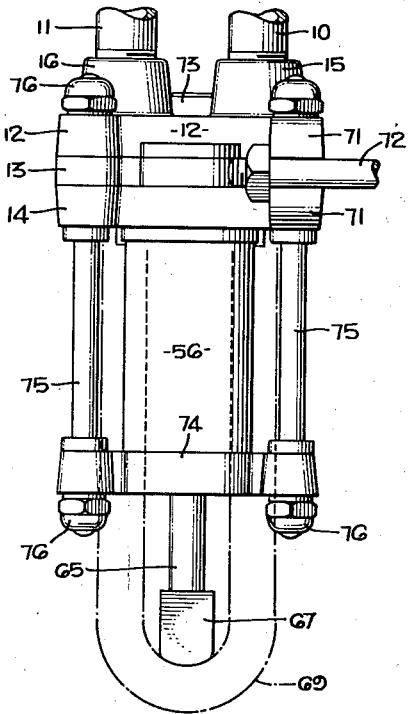
Figure 6:
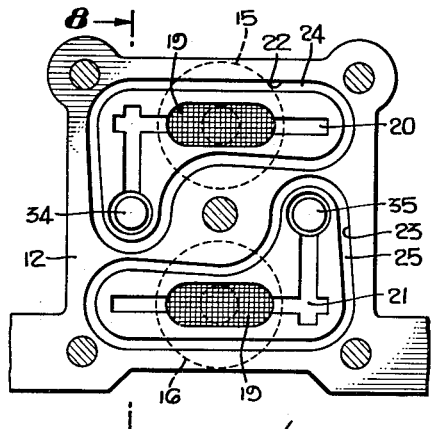
Figure 9:
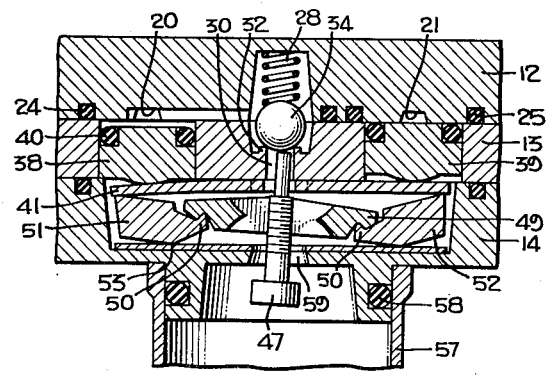
Figure 7:
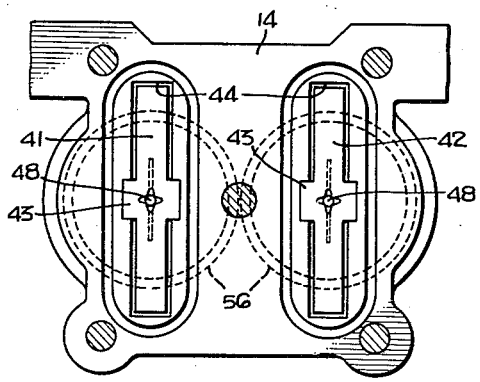
Figure 10:
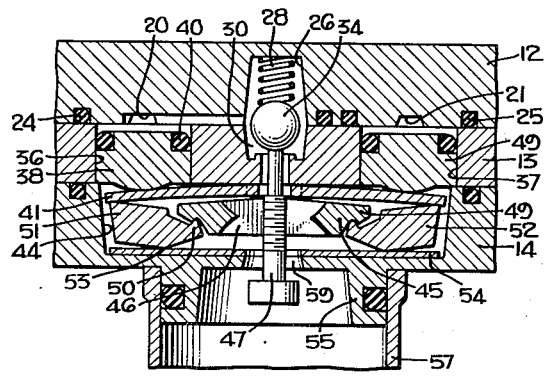
Figure 8:
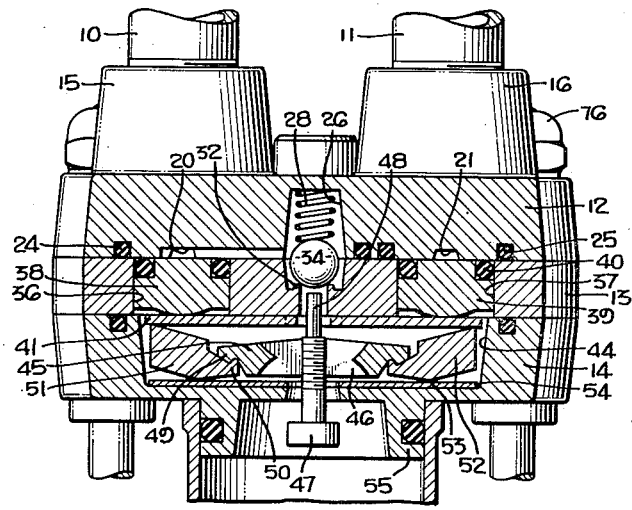

With the foregoing and other objects in view, which will be made manifest in the following detailed description and specifically pointed out in the appended claims, reference is had to the accompanying drawings for an illustrative embodiment of the invention, wherein:

Figure 1 is a top plan view of the improved compensator;

Fig. 2 is a view in front elevation of the same;
Fig. 3 is a view in side elevation of the same;
Fig. 4 is a partial view in vertical section taken substantially upon the line 4—4 upon Fig. 2 in the direction indicated;
Fig. 5 is a view on an enlarged scale in vertical section taken substantially upon the line 5—5 upon Fig. 1 in the direction indicated;
Fig. 6 is a view taken substantially upon the line 6—6 upon Fig. 5 in the direction indicated;
Fig. 7 is a view taken substantially upon the line 7—7 upon Fig. 5 in the direction indicated;
Fig. 8 is a partial view in vertical section taken substantially upon the line 8—8 upon Fig. 6, illustrating the parts in a normal position;
Fig. 9 is a similar view, but illustrating one of the pistons associated with a valve as having been depressed by the pressure exerted in one line between the actuator and the motor of a telemotor system; and
Fig. 10 is a partial view in vertical section similar to Fig. 9, but illustrating both pistons associated with a valve as having been depressed as is occasioned by temperature rise creating an expansion of the liquid in both lines of a telemotor system between the actuator and the motor.

Referring to the accompanying drawings wherein similar reference characters designate similar parts throughout, the compensator embodying the present invention is adapted to be connected as by conduits 10 and 11 to the two lines of a telemotor system between an actuator and its motor. As above explained, if the actuator is operated in one direction the pressure in the conduit 10 may be quite high and the pressure in the conduit 11 may be quite low due to the fact that the liquid therein is merely being returned from the motor to the actuator. If the actuator is operated in the reverse direction the pressure in the conduit 11 may be quite high and the pressure in the conduit 10 may be quite low as the liquid therein is merely being returned from the motor to the actuator.

If the temperature of the system rises causing the liquid to expand in both lines, pressure in both conduits 10 and 11 will increase and must be bled off. Conversely, if the temperature of the system decreases the liquid in both lines of the telemotor system may contract and must be compensated for by the addition of additional fluid to the lines.

The compensator embodying the present invention consists of a body composed of three body parts 12, 13, and 14. The body part 12 has some internally threaded bosses 15 and 16 into which the conduits 10 and 11 may be screwed. Ports 17 and 18 communicate with the interiors of the bosses and conduct fluid therefrom to the opposed face of the body part 12. In these ports there may be protective screens 19. On the face of the part 12 there are formed angular grooves 20 and 21 which transmit the fluid from the ports 17 and 18 over the tops of cylinders that are formed in the body part 13 and to valve chambers for ball escape valves to be described. The angular grooves 20 and 21 are, in turn, each surrounded by endless or angular grooves 22 and 23 designed to receive packing or O-rings 24 and 25. The body part 12 also has cavities 26 and 27 formed therein designed to receive compression springs 28 and 29 of escape valves.

The central body part 13 has passages 30 and 31 formed therein arranged in alignment with the cavities 26 and 27 and these passages are so formed as to provide valve seats 32 and 33 for ball check valves or escape valves 34 and 35 which are urged against their respective seats by the compression springs 28 and 29, respectively. In the body part 13 there are also formed four cylinders, two of which indicated at 36 and 37, are arranged oppsite the apex of the angular groove 21 and the end of the angular groove 20, respectively. The other two cylinders are arranged opposite the apex of the angular groove 20 and the end of the angular groove 21, respectively. The first-mentioned pair of cylinders may be regarded as being associated with the escape valve 34 and the second pair of cylinders may be regarded as being associated with the escape valve 35. Within these cylinders there are reciprocable pistons, the pistons in the cylinders 36 and 37 being indicated at 38 and 39. These pistons are equipped with suitable packing, such as O-rings 40.

The lower body part 14 has a recessed face which is recessed to accommodate leaf springs 41 and 42. Each of these leaf springs has laterally extending wings 43 by which they are centrally supported on the face of the body part 14. The ends of these leaf springs are free, however, to be depressed into cavities 44. The wings 43 are clamped betwen the body parts 14 and 13 so the springs have their ends bearing respectively against the backs or under sides of the pistons that are within the central body part 13. Within each cavity 44 beneath the springs 41 and 42, respectively there are teeter members 45 which extend longitudinally of the cavity. These teeter members have longitudinally extending slots 46 milled therein and adjacent their centers they have threaded apertures which are traversed by the slots 46 and which receive threaded screws 47. The upper ends of the screws are of reduced diameter as indicated at 48 and extend upwardly through apertures formed in the springs 41 and 42. These reduced ends extend upwardly into the central body member 13 so as to be engageable with the ball valves 34 and 35, respectively, as will be hereinafter explained. At the ends of the teeter members there are hook-shaped extensions 49 which are engaged by hook-shaped extensions 50 on teeter member lifters 51 and 52 disposed beneath the pistons 38 and 39. These teeter member lifters have protuberances 53 on their under surfaces which are engageable with steel wearing plates 54 disposed in the bottoms of the recesses 44. The arrangement is such that normally the springs 41 and 42 will urge their respective pistons into their uppermost positions as disclosed in Fig. 7 in which case the weight of the teeter members 45, together with that of the screw 47, causes the teeter member to remain near the bottom of the cavity 44. This may be supplemented by the pressure of the springs 28 and 29 acting upon their respective balls 34 and 35. However, if one of the pistons, such as the piston 38, should be depressed by pressure in one of the telemotor lines its motion will be transmitted through the end of a spring to rock a teeter member lifter such as is illustrated in Fig. 9. Such action is merely an idle movement in so far as unseating a ball valve is concerned, it being understood that the teeter member 45 is merely lifted in one end but has its opposite end in a lowered position. Consequently, the upper end of the screw 47 is not lifted but is merely swung laterally as depicted in Fig. 9. However, in the event that both pistons 38 and 39 on a pair are both depressed due to an expansion of liquid in both lines of the telemotor system occasioned by a temperature increase, both of the teeter member lifters 51 and 52 will be both actuated as illustrated in Fig. 10 to lift the teeter member 45 and consequently lift the screw 47 so that its end 48 will engage and lift the ball valve against the action of the compression spring 28. This permits liquid to flow from the conduit 10 past the ball valve.

The bottom of the lower body part 14 is provided with bosses 55 over which are telescoped accumulator reservoirs 56 and 57. These bosses may be grooved to receive sealing rings 58 such as O-rings. The bottom of the body part has apertures 59 formed therein establishing communication betwen the bottom of the recess 44 and the accumulator reservoirs 56 and 57, respectively. In these accumulator reservoirs there are pistons 60 and 61 equipped with packing rings 62 and having piston rods 63 and 64 respectively. The piston rods are preferably hollow and telescope into sleeves 65 and 66, respectively, that are connected to a crosshead 67. Apertures 68 formed in the crosshead provide communication between the interiors of the sleeves and atmosphere. A coil tension spring 69 has its ends secured to ears 70 on the lower body part 14 and a crosshead is preferably recessed to provide a saddle for the central portion of this spring. This spring constantly urges the crosshead 67 upwardly.

The operation of the above-described construction is substantially as follows:

In normal operation where there has been no change in temperature a high pressure in the conduit 10 and a low pressure in the conduit 11 will merely produce a teetering action of the teeter member 45 such as is depicted in Fig. 9. Conversely, if there is high pressure in the conduit 11 and low pressure in the conduit 10 the teetering member 45 will merely teeter in the opposite direction from that depicted in Fig. 9. Consequently, during normal operation the ball check valves are never unseated and pressure may be transmitted through either line from the actuator to the motor. If, due to a temperature rise the pressure in both conduits 10 and 11 increases, both pistons will be depressed simultaneously and the teeter member 45 will be bodily lifted unseating the check valve and permitting fluid to escape therefrom past a ball valve into one of the accumulator reservoirs 56 and 57. Most of the liquid that is thus released from the telemotor system into the accumulator reservoirs is released from that line having the highest pressure at the time that the ball valve is unseated.

It is desirable when the temperature of the system subsequently falls to return liquid from that accumulator reservoir which has received the most fluid from the system. Thus, when circumstances have been such that the accumulator reservoir 57 has received more liquid from the telemoter system through the conduit 10 than reservoir 56 has received from the conduit 11, it is desirable to return liquid from reservoir 57 and maintain the telemotor system in balance. That is, maintain the relationship initially established between the actuator and motor of the telemotor system.

If the reservoir 57 has received more liquid than reservoir 56 its piston 61 will be depressed to a greater extent than the piston 60. Consequently, its piston rod 64 will engage the crosshead 67 and will be urged thereby due to the tension of the tension spring 69 to return liquid to the system. As the piston 60 does not have its piston rod 63 engaging the crosshead, this piston will not be urged upwardly by the spring 69. Consequently, as soon as conditions permit, such as by the contraction due to a reduced temperature, piston 61 will return liquid from the reservoir 57, past the check valve 34 to the telemotor system. Conversely, if reservoir 56 has received more liquid from the telemotor system its piston 60 will be depressed to a greater extent and would be urged by the spring 69 to return its liquid to that line of the telemotor system from which it had received it. In this manner, each accumulator reservoir tends to return its liquid back to the system and if one reservoir has received more liquid than the other its liquid will be returned in advance of the other.

The top and bottom body members 12 and 14 are equipped with laterally extending lugs 71 between which attaching bolts 72 may be extended for mounting the compensator on any suitable support. The central bolt 73 which extends through all three body members is used primarily to hold the body members in assembled relationship in the course of making a sub-assembly while the accumulator reservoirs 56 and 57 are being applied. These cylinders are held in position by means of a closure 74 fitting over their lower ends and connected to the body of the compensator by bolts 75. These bolts 75 extend through ears on the closure 74 and through the body members and may be suitably equipped at their ends with acorn nuts 76.

From the above-described construction it will be appreciated that an improved simple and sturdy compensator for telemotor systems has been provided wherein the body of the compensator is so designed that its parts may, if desired, be produced from die castings. If diecastings are employed the various recesses and openings in these parts may be cast directly therein and when the parts are mutually assembled the grooves provide adequate conduits from the bosses 15 and 16 to the tops of the four pistons and to the chambers for the ball escape valves. Leakage is adequately prevented by means of the packing or O-ring. The arrangement is such that by virtue of the reverse action accomplished by the teeter member lifters that a highly compact unit may be constructed.

Various changes may be made in the details of construction without departing from the spirit and scope of the invention as defined by the appended claims.

I claim:

1. A compensator comprising a body providing two accumulator reservoirs, means on the body providing a passage leading from each reservoir to a line in a closed hydraulic system, a check valve in each passage normally preventing flow from a line into its reservoir, a stem in each passage engageable with its valve to unseat the valve and permit such flow, a pair of pistons associated with each valve reciprocable in the body, one piston of each pair being exposed to pressure in one line of the closed hydraulic system and the other piston of each pair being exposed to pressure in the other line of the closed hydraulic system, a teeter member associated with the stem of each valve, teeter actuators interposed between the pistons and the teeter members whereby actuation of both pistons associated with each valve is necessary to unseat the valve, accumulator pistons in the accumulator reservoirs, a crosshead between the pistons, a slidable connection between each accumulator piston and a crosshead, and spring means urging the crosshead in a direction to cause either or both of the accumulator pistons to expel the contents of the accumulator reservoirs therefrom.

2. A compensator comprising a body providing two accumulator reservoirs, means on the body providing a passage leading from each reservoir to a line in a closed hydraulic system, a check valve in each passage normally preventing flow from a line into its reservoir, a stem in each passage engageable with its valve to unseat the valve and permit such flow, a pair of pistons associated with each valve reciprocable in the body, one piston of each pair being exposed to pressure in one line of the closed hydraulic system and the other piston of each pair being exposed to pressure in the other line of the closed hydraulic system, a teeter member associated with the stem of each valve, teeter actuators interposed between the pistons and the teeter members whereby actuation of both pistons associated with each valve is necessary to unseat the valve, and means associated with each reservoir for receiving the flow therewithin and for urging flow therefrom respectively.

3. A compensator comprising a body providing two accumulator reservoirs, means on the body providing a passage leading from each reservoir to a line in a closed hydraulic system, a check valve in each passage normally preventing flow from a line into its reservoir, a stem in each passage engageable with its valve to unseat the valve and permit such flow, a pair of pistons associated with each valve reciprocable in the body, one piston of each pair being exposed to pressure in one line of the closed hydraulic system and the other piston of each pair being exposed to pressure in the other line of the closed hydraulic system, a teeter member associated with the stem of each valve, teeter actuators interposed between the pistons and the teeter members whereby actuation of both pistons associated with each valve is necessary to unseat the valve, spring means interposed between the pistons and their teeter actuators urging the pistons against the pressures to which they are exposed, and means associated with each reservoir for receiving flow therewithin and for urging flow therefrom respectively.

4. A compensator comprising a body having two chambers adapted to be connected to two lines of a closed hydraulic system, a check valve in each chamber normally preventing flow from a line thereby, a stem in each chamber engageable with its valve to unseat the valve and permit such flow, a pair of pistons associated with each valve reciprocable in the body, one piston of each pair being exposed to the pressure in one chamber and the other piston of each pair being exposed to the pressure in the other chamber, a teeter member associated with the stem of each valve, teeter actuators interposed between the pistons and the teeter members whereby the actuation of both pistons associated with each valve is necessary to unseat the valve, and structure in communication with each line and association with each valve for receiving and urging flow from and into said lines respectively.

5. In a compensator, a body composed of three adjacent parts, one of which provides for connecting the body to the lines of a closed hydraulic system and an adjacent part providing valve seats, valves adapted to seat against said valve seats, means on the first-mentioned part for conducting fluid under pressure from the lines of the closed hydraulic system to the valve seats, said adjacent part providing cylinders, pistons reciprocable in the cylinders, one pair of pistons being associated with each valve, means for conducting fluid under pressure from the lines of the closed hydraulic system to one piston of each pair, a third body part adjacent the last-mentioned body part, teeter members recessed in the third body part, said teeter members having stems engageable with the valves to unseat the same, teeter member actuators recessed in the third body part operable by the pistons to shift the teeter members to cause the stems thereon to unseat their respective valves when the pistons of each pair are both actuated, and structure in communication with each line and associated with each valve for receiving and urging the flow of fluid from and into said lines.

6. In a compensator, a body composed of three adjacent parts, one of which provides for connecting the body to the lines of a closed hydraulic system and an adjacent part providing valve seats, valves adapted to seat against said valve seats, means on the first-mentioned part for conducting fluid under pressure from the lines of the closed hydraulic system to the valve seats, said adjacent part providing cylinders, pistons reciprocable in the cylinders, one pair of pistons being associated with each valve, means for conducting fluid under pressure from the lines of the closed hydraulic system to one piston of each pair, a third body part adjacent the last-mentioned body part, teeter members recessed in the third body part, said teeter members having stems engageable with the valves to unseat the same, teeter member actuators recessed in the third body part operable by the pistons to shift the teeter members to cause the stems thereon to unseat their respective valves when the pistons of each pair are both actuated, springs disposed above the teeter members having portions interposed between the pistons and the teeter member actuators to urge the pistons against the pressures to which they are subjected, and structure in communication with each line and associated with each valve for receiving and urging the flow of fluid from and into said lines.

References Cited in the file of this patent

UNITED STATES PATENTS

| Number | Name | Date |
|---|---|---|
| 375,674 | Greene | Dec. 26, 1887 |
| 2,397,270 | Kelly | Mar. 26, 1949 |